(12) United States Patent
Tucker

(10) Patent No.: US 8,432,086 B2
(45) Date of Patent: Apr. 30, 2013

(54) FERRO FLUID FOR INDUCING LINEAR STRESS

(75) Inventor: Randall L. Tucker, Findlay, OH (US)

(73) Assignee: Cooper Tire & Rubber Company, Findlay, OH (US)

( * ) Notice: Subject to any disclaimer, the term of this patent is extended or adjusted under 35 U.S.C. 154(b) by 288 days.

(21) Appl. No.: 12/928,606

(22) Filed: Dec. 15, 2010

(65) Prior Publication Data

US 2011/0187234 A1    Aug. 4, 2011

Related U.S. Application Data

(60) Provisional application No. 61/337,364, filed on Feb. 2, 2010.

(51) Int. Cl.
*H01L 41/113*    (2006.01)

(52) U.S. Cl.
USPC .......................................................... 310/339

(58) Field of Classification Search .................. 310/338, 310/339
See application file for complete search history.

(56) References Cited

U.S. PATENT DOCUMENTS

| | | | |
|---|---|---|---|
| 5,547,049 A | 8/1996 | Weiss et al. | |
| 6,899,338 B2 | 5/2005 | Li et al. | |
| 6,977,025 B2 | 12/2005 | McArdle et al. | |
| 7,063,802 B2 | 6/2006 | Tsuda et al. | |
| 7,338,049 B2 | 3/2008 | Li | |
| 7,808,159 B2 | 10/2010 | Tucker et al. | |
| 2007/0215553 A1 | 9/2007 | Yellen et al. | |
| 2007/0296283 A1* | 12/2007 | Tucker et al. | 310/26 |
| 2008/0006352 A1 | 1/2008 | Koshiba | |
| 2009/0167115 A1 | 7/2009 | Tucker et al. | |

OTHER PUBLICATIONS

International Search Report and Written Opinion; mailed Feb. 23, 2011.
J. G. Wan and J.-M. Liu; Giant magnetoelectric effect of a hybrid of magnetostrictive and piezoelectric composites; Journal of Applied Physics, vol. 93, No. 12; Jun. 15, 2003.
International Preliminary Report on Patentability; Date of Issuance f Report Aug. 7, 2012.

* cited by examiner

*Primary Examiner* — Derek Rosenau
(74) *Attorney, Agent, or Firm* — Emch, Schaffer, Schaub & Porcello Co., L.P.A.

(57) ABSTRACT

A device for generating electrical energy has a sheet of piezo material with an array of holes formed therein. At least some of the holes are filled with ferro fluid which expands in the holes upon being subjected to a change in magnetic energy. The sheet of piezo material generates an electrical potential in response to applied mechanical strain caused by the expansion of the ferro fluid in the holes of the piezo sheet.

10 Claims, 5 Drawing Sheets

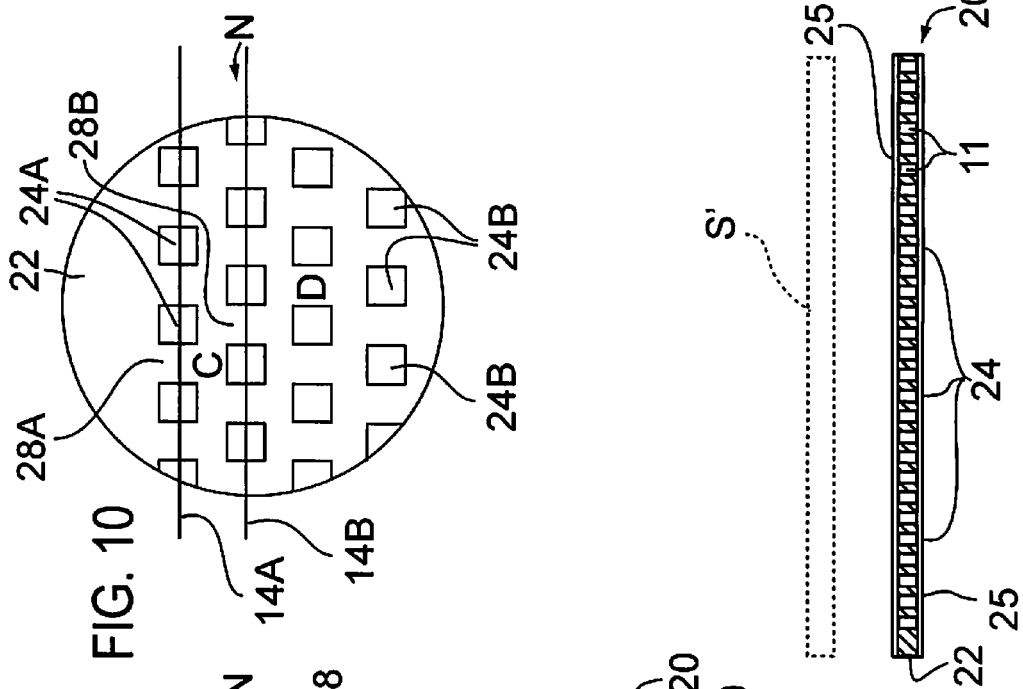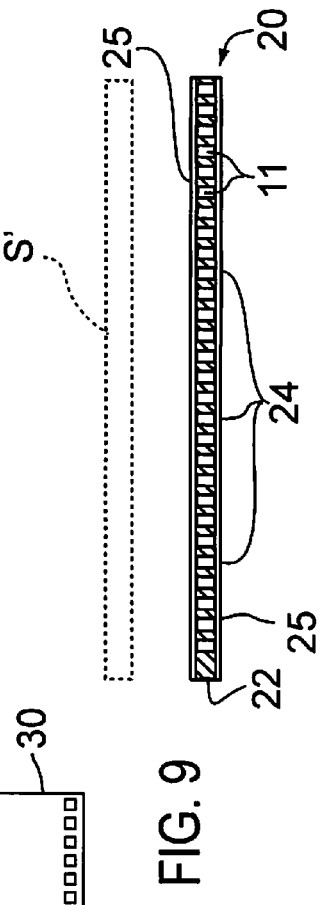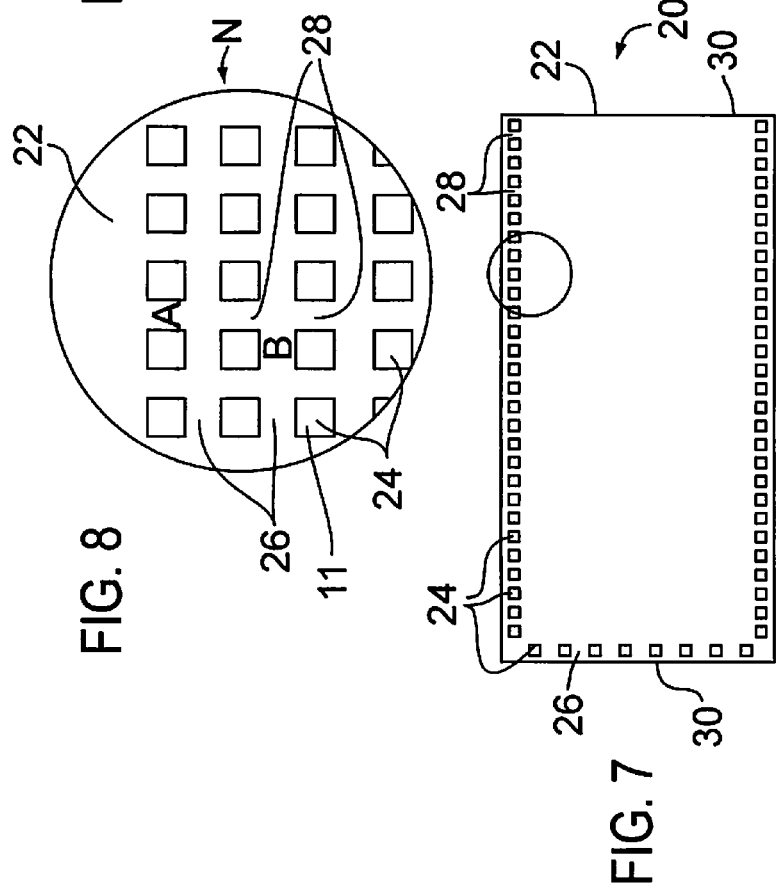

FERRO FLUID FOR INDUCING LINEAR STRESS

CROSS REFERENCE TO RELATED APPLICATIONS

The present application is based upon and claims the benefit of U.S. provisional patent application No. 61/337,364 filed Feb. 2, 2010.

BACKGROUND OF THE INVENTION

The present invention is directed to a ferro fluid in combination with a piezo device for power generation. A piezo material is a material that can generate an electrical field in response to mechanical stress. Piezo materials include naturally occurring crystals, man made crystals such as gallium, orthophosphate ($GaTO_4$) and langasite ($La_3Ga_5SiO_{14}$), man made ceramics such as barium-titanate ($BaTiO_3$), lead titanate ($PvTrO_3$), lead zirconium-titanate (PZT) and polymers such as polyvinylidene fluoride (PvDF).

A ferro fluid is colloidal mixture of magnetic particles, less than ten nm in diameter, in a liquid carrier. The carrier contains a surfactant to prevent the magnetic particles from sticking together. The carrier can be water or organic fluid. A typical ferro fluid is about 5% magnetic solids, 10% surfactant and 85% carrier, by volume. One type of ferro fluid uses magnetite for the magnetic particles, oleic acid as the surfactant and kerosene as the carrier fluid to suspend the particles.

When no external magnetic field is present, the orientation of the magnetite or other magnetic particles is random. In other words, the magnetic ferro particles are not aligned with adjacent ferro particles when no external magnetic field is applied except possibly by happenstance. However, when an external magnetic field is applied, the ferro particles align with the magnetic field lines. When the magnetic field is removed, the particles return to random positioning. According to the present invention a ferro fluid with the above discussed properties is used in combination with a piezo material to stretch and induce stresses to the piezo material to thereby generate electric power.

US patents and patent publications disclosing magnetic fluids including ferro fluid include U.S. Pat. Nos. 6,899,338; 6,977,025; 7,063,802; 7,338,049 and US 2006/0215553.

It is heretofore been known to utilize a magnetostrictive material to induce stress in a piezo to produce power. Magnetostrictive materials are broadly defined as materials that under go a change in shape due to change in the magnetization state of the material and include common materials such as nickel, iron and cobolt in which the change in length is on the order of 10 parts per million when subjected to magnetization. Thus, the magnetostrictive material elongation growth is very limited. As a result, when magnetstrictive materials are used in combination with a piezo, the power is very limited.

Patents which show the use of RFID devices for use with tires include my U.S. Pat. No. 7,504,947. Other devices, including RFID devices, which may be incorporated on a surface of or within the structure of a tire for monitoring various functions relative to the tire include the following U.S. Pat. Nos. 5,562,787; 5,741,966; 6,062,072; 6,438,193; 6,856,245; 6,897,770; 7,009,576; 7,132,939; and 7,186,308. Patents which disclose devices utilizing piezo material with magnetostrictive material or other filler material include U.S. Pat. Nos. 6,809,516 and 7,069,642. The disclosures contained in these and the previously referenced patents are incorporated herein by reference.

SUMMARY OF THE PRESENT INVENTION

Under the present invention the ferro particles used in the ferro fluid are elongated such that, when the ferro fluid is subjected to a magnetic field, the particles move from random placement to an aligned orientation, with the alignment following the lines of the magnetic field. The ferro particles are non-spherical, elongated or somewhat egg-shaped, with the ends defining what may be called north and south polar ends defining a longitudinal axis. The magnetic field causes the longitudinal axis of each of the ferro particles to become aligned with the magnetic lines of the magnetic field and, therefore, aligned with the longitudinal axis of adjacent ferro particles thereby producing linear growth in a group of adjacent particles. When the ferro fluid is confined in a structure of piezo material, such linear growth will induce stress on the confining piezo material. The stress placed on the piezo material results in the generation of electric power. The amount of power generated by the ferro fluid and piezo material combination of the present invention greatly exceeds the amount of power generated by a combination of piezo and magnetostrictive material. The length to width ratio of the ferro particles can be changed to provide and vary the amount of power generation desired.

Under the present invention a piezo structure is provided having an array of holes, at least some of which are filled with ferro fluid having non-spherical, elongated or egg shaped ferro particles. When the piezo structure with such ferro fluid confined in the holes or recesses is subjected to a change in magnetization, it undergoes a change in shape due to the alignment of the ferro particles with the result that the ferrofluid in the holes of the piezo imparts a stretch or strain on the piezo material to thereby provide generation of electric power.

Objects and advantages of the present invention will become apparent to those skilled in the art upon a review of the following detailed description of the preferred embodiments and the accompanying drawings.

IN THE DRAWINGS

FIG. 7 is a plan view of a piezo sheet having square holes to be filled with ferro fluid.

FIG. 8 is an enlarged view of a portion of FIG. 7 showing one form of alignment of holes in the piezo sheet.

FIG. 9 is a sectional view of the piezo sheet with upper and lower sheets sealing the holes.

FIG. 10 is a view similar to FIG. 8 of a modified embodiment showing an alternating matrix of holes in the piezo sheet.

DETAILED DESCRIPTION OF THE INVENTION

Figure 2:
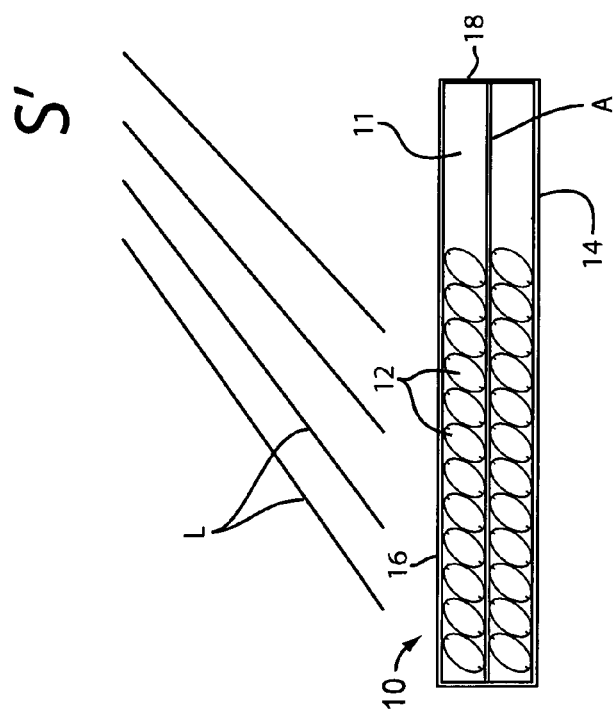
FIG. 2 is a view similar to FIG. 1 showing the position of the ferro particles when subjected a magnetic field at an angled position relative to the piezo structure.
Figure 3:
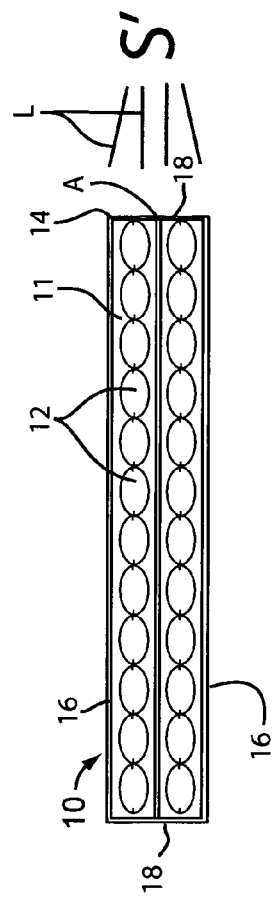
FIG. 3 is a view similar to FIG. 1 showing the positioning of the magnetic particles when subjected to a magnetic field positioned lengthwise of the piezo structure and the magnetic lines substantially parallel to the longitudinal axis of such structure.
Figure 4:
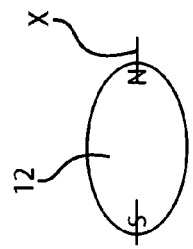
FIG. 4 is a schematic view showing a single ferro particle of oblong shape and showing the north and south polar regions.

Referring to FIGS. 1-4, there is shown a combination 10 of ferro fluid 11 having ferro particles 12 contained in a piezo containment structure 14. As can be seen in FIG. 4, each of the ferro particles 12 is oblong or egg-shaped having what may be called a north polar region N and a south polar region S cooperating to define a longitudinal axis X. The length of a particle 12 may, for example, be 5 nm and the width 4.2 nm, with a range of 3 to 200 nm for the length and a range of 2 to 150 nm for the width.

Figure 1:
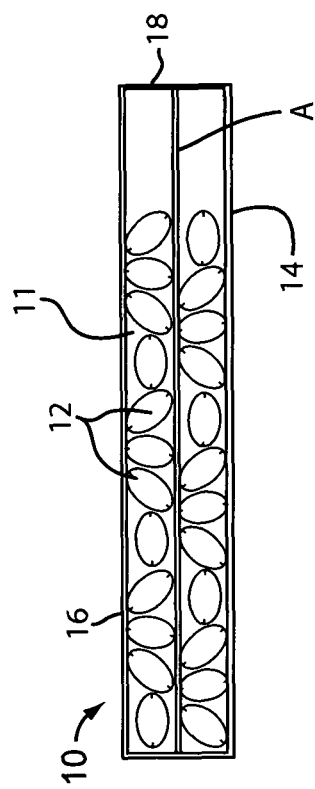
FIG. 1 is a schematic view showing ferrofluid enclosed in a piezo structure with the ferro particles randomly disbursed.

As shown in FIG. 1, when not subjected to magnetization, the ferro particles 12 in a containment structure 14 are randomly dispersed in the fluid 11. However, when subjected to a magnetic field, the particles 12 become aligned such that their respective longitudinal axes X are aligned with the magnetic lines of the magnetic field. In FIG. 2, the combination 10 of the containment structure 14 and the ferro fluid 11 is positioned such that the magnetic lines L of the magnetic field source S' is at an angle of approximately 30 degrees relative to the longitudinal axis A of the piezo containment structure 14. As a result of the alignment of adjacent ferro particles 12 along the lines L disposed at such angle, stress is placed on the long side walls 16 of the piezo containment structure 14.

FIG. 3 shows the orientation of the ferro particles 12 when the magnetic lines L extend in the direction of the axis A of the piezo containment structure 14. With the magnetic fields so positioned and the magnetic lines L extending in the same direction as the axis A, the axis X of each ferro particle 12 becomes aligned with the axis X of each adjacent ferro particle 12 thereby causing an elongation of the group of ferro particles 12 within the containment structure 14. Such elongation of the group of ferro particles 12 places a stress on the ends 18 of the piezo containment structure 14 thereby resulting in generation of electrical power.

The dimensions of the ferro particles can be adjusted to place a lesser or greater amount of stress on the piezo structure 14 to thereby vary the amount of electricity generated upon alignment of the ferro particles 12. The ferro particles 12 can have an oval shape in longitudinal cross section, egg shape, oblong or other non-spherical shape.

Figure 6:
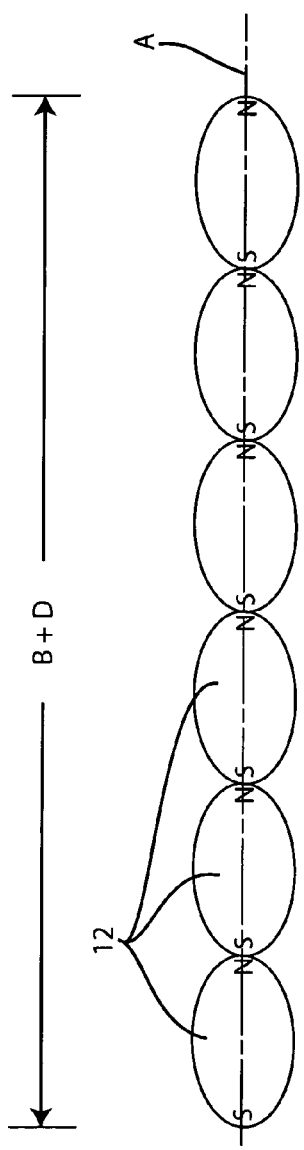
FIG. 6 is a view similar to FIG. 5 showing the increase in length of the group when subjected to a magnetic field extending along the longitudinal axis of the group.
Figure 5:
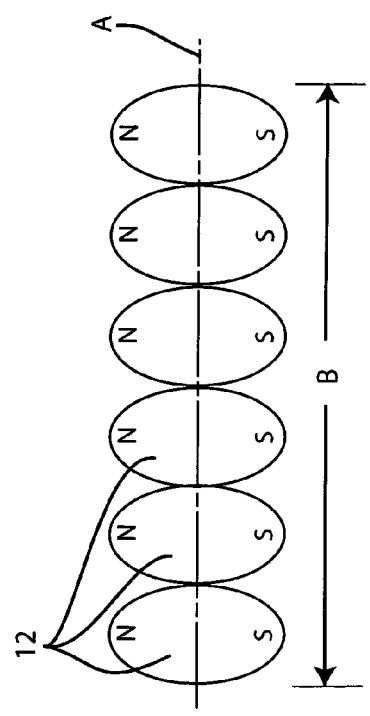
FIG. 5 is a schematic view showing the length of a group of six ferro particles when aligned with the longitudinal axis of each ferro particle at right angles to the longitudinal axis of the aligned group.

FIGS. 5 and 6 give a comparison of the length of an array of six oval shaped ferro particles 12 when their north-south axes X are perpendicular to the longitudinal axis A of the array with the length of the array when their north-south axes X are parallel to the axis A of the array. Thus, FIG. 5 shows the length of the array as B and FIG. 6 shows the length of the array in the parallel axes orientation as B & D where D is the difference between the length and width of the ferro particles times the number of particles in the array.

Referring to FIGS. 7-9 there is shown one embodiment of the piezo/ferro fluid device 20 of the present invention. The device comprises a sheet 22 of piezo material such as quartz, topaz, cane sugar, Rochelle salt, man-made crystals, power ceramics such as Langasite, barium titanate, or polymers such as polyvinylidene fluride (PVDF). There are no shape or particular size requirements for the length or width of the sheet 22, however, preferably it is in the range of 0.1 to 200 millimeters (mm) in length and 0.1 to 200 mm in width. The thickness of the piezo sheet 22 should be in the range of 0.005 to 1.0 mm.

As previously noted, piezo material has the ability to generate an electrical potential when subject to an applied mechanical stress. Taking advantage of this property of piezo materials, the sheet 22 has formed therein and an array of holes 24 which are filled with ferro fluid 11 of the type described with reference to FIGS. 1-6.

Although FIG. 7 shows the holes 24 only along the longitudinal edges and one widthwise edge, it should be understood that the holes 24 will be substantially throughout the piezo sheet 22. The pattern of the holes 24 could be one of a variety including the pattern shown. in FIG. 8 or the pattern shown in FIG. 10 if the holes 24 were square or circular or the pattern shown in FIG. 11 if the holes were rectangular.

As noted above, piezo material has the property of generating an electrical potential in response to an applied mechanical strain. According to the present invention, such mechanical strain may be selectively imparted to the piezo sheet 22 by positioning in the holes 24 ferro fluid 11 with ferro particles 12 such as set forth above.

As shown in FIG. 9, the ferro fluid 11 is contained in the holes 24 of the sheet 22 of the piezo material by upper and lower containment sheets 25 adhered to the upper and lower surfaces of the piezo sheet 22. Any of a wide variety of plastic materials could be used for such containment sheets 25; however, the plastic material in sheet form should have sufficient rigidity to contain the ferro fluid 11 in the holes 24 such that, when subjected to magnetic forces from a magnetic field sources as previously discussed, the expansion of the ferro fluid 11 will impart sufficient stress on the piezo sheet 22 to generate the desired electrical current. Examples of such suitable plastic material include polycarbonate resin such as Lexan® or an acetel resin such as Delrin®.

With respect to the arrangement of the holes 24, under the embodiment of FIG. 8, the holes 24, which can be of any shape or size, are positioned in an aligned matrix such that all holes 24 extending in a lengthwise direction are in one of a number of aligned straight line rows and all holes 24 extending in a widthwise direction are also in one of a series of aligned straight line rows extending widthwise with no interruptions. The holes 24 could be as small as one nanometer (nm) and as large as desired. The spaces between the aligned rows of holes 24 extend both lengthwise and widthwise of the sheet 22 on straight line paths without interruption. The spaces between the holes aligned in the longitudinal direction are designated by the numeral 26 and the spaces between the holes 24 aligned in the widthwise direction are designated by the numeral 28.

In contrast to the embodiment of FIG. 8, in FIG. 10 there is shown a modified embodiment in which the rows of holes 24 have an alternating matrix with respect to the rows of holes extending widthwise of the sheet 22. Thus, as can be clearly seen in FIG. 10, holes 24A define a first set of widthwise extending rows which are parallel to and spaced from one to another. A second set of holes 24B define a second set of widthwise rows which are parallel to and spaced from one another but which are offset from the first set of widthwise rows formed by holes 24A.

In FIG. 10, the spaces in the widthwise direction between the holes 24A are designated by the numeral 28A and the spaces in the widthwise direction between the holes 24B are designated by the numeral 28B. As a result of the positioning of the holes 24A and 24B of the alternating matrix of embodiment of FIG. 10, the spaces 28A and 28B do not provide uninterrupted rows in the widthwise direction. Thus, in this embodiment, holes 24A interrupt the row of spaces 28B and holes 24B interrupt the row of spaces 28A.

The row of spaces 26 in the longitudinal direction between the longitudinal row of holes 24A and the longitudinal row of holes 24B are uninterrupted.

The ferro fluid is positioned in some or all of the holes 24, including, in the case of the alternating matrix of FIG. 10, both sets of holes 24A and 24B. When the device 20 of the piezo sheet 22 with ferro fluid 11 in the holes 24 is subjected to a change in the magnetization state thereof, the ferro fluid in the holes 24A and 24B will undergo a change of shape thereby resulting in a strain imparting a stretching to the piezo sheet 22 thereby providing power generation to the piezo/ferro fluid device 20.

As shown in FIG. 7, electrodes 30 are mounted on opposing ends of the piezo sheet 22.

Although the piezo sheet 22 is shown in FIG. 7 as being rectangular in shape, it could have any of wide variety of shapes such as circular or oval.

It is possible to vary and/or maximize the performance capacity of the piezo/ferro fluid device 20 and to tune its resonant frequency by varying the shape of the ferro particles as well as by varying the size, shape or density of the holes 24.

Additionally, the alternating matrix of placement of the holes 24A and 24B as shown in FIG. 10 will provide different performance characteristics than the aligned matrix of FIG. 8. Accordingly, by means of the above variations of the matrix, hole size, hole shape and hole density it is possible to tailor the device to have any one of a number of performance characteristics.

As may be seen in FIG. 8, the aligned matrix of holes 24 provides, upon a change in magnetization and exposure to a magnetic field from the direction indicated by arrow N, a stretching of the ferro fluid 11 contained in the holes 24 thereby inducing a mechanical stretch to the piezo material of the sheet 22 in the area represented by the letter "A" in the widthwise spaces 28 between rows of holes 24. Similarly, spaces 26 between lengthwise aligned rows of holes 24 evidence a compressive force as represented by the letter "B", assuming a magnetic field from the direction indicated by the arrow N.

In the case of the alternating matrix shown in FIG. 10, the spaces 26 between the longitudinal extending rows 14A, 14B show the stretching in the area designated by the letter "C" due a change in the magnetization from the direction N of the magnetostrictive material in the holes 24. However, in contrast, to the hole alignment of FIG. 8, in the alternating matrix of FIG. 10, the spaces 28A between holes 24A are misaligned or out of alignment widthwise as are the spaces 28B between the holes 24B. Assuming a magnetic field from the direction indicated by the arrow N, the spaces in the area designated "C" in FIG. 10 will be stretched and the spaces in the area designated "D" will be in compression.

As will be readily appreciated, although the embodiment shown in FIG. 10 shows positioning the holes 24A and 24B such that adjacent rows of holes are out of alignment widthwise with respect to one another, it is within the contemplation of the present invention that the lengthwise rows of holes 24 could also be out of alignment with adjacent rows of holes.

Figure 11:
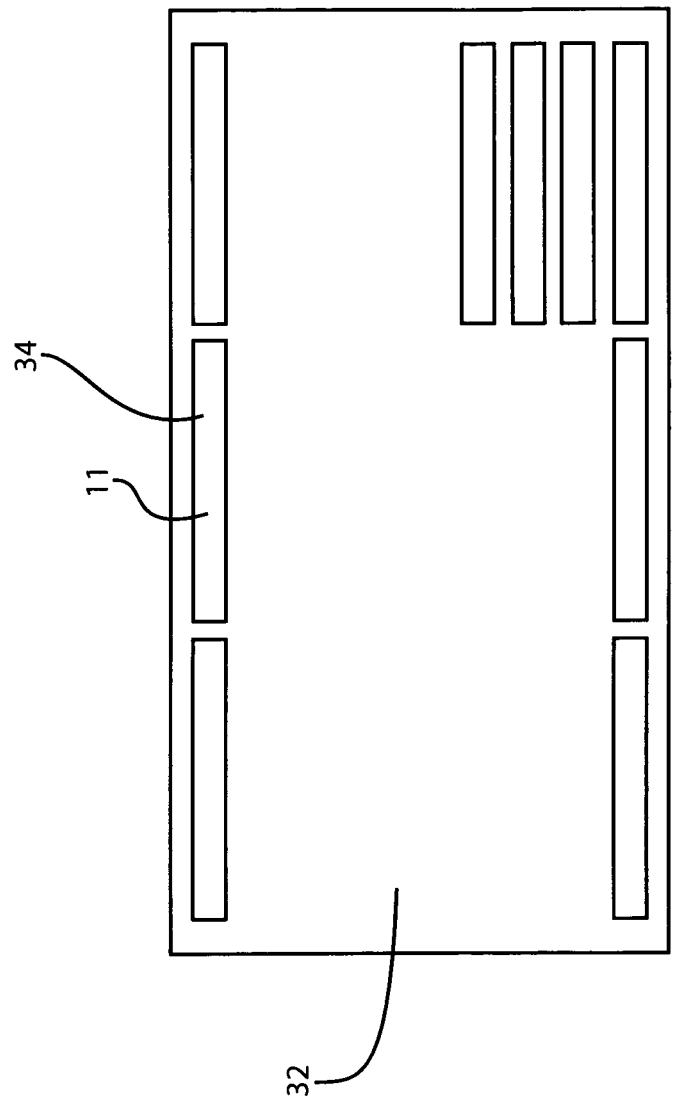
FIG. 11 is a view similar to FIG. 7 but with the piezo sheet having rectangular holes to be filled with ferrofluid.

FIG. 11 shows an embodiment in which the piezo sheet 32 is provided with holes 34 which are rectangular in shape. The rectangular holes are filled with ferro fluid 11 having ferro particles as previously described.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A method for generating electrical energy comprising the steps of:
   (a) providing a sheet of piezo material having holes or recesses;
   (b) placing in said holes or recesses a ferro fluid having non-spherical or oblong ferro particles with a long axis and a short axis perpendicular thereto, said ferro particles being randomly positioned when placed in said holes or recesses; and
   (c) subjecting said ferro fluid within said holes or recesses to a magnetic force to cause said ferro particles to become oriented with long axes of adjacent ferro particles becoming aligned, said alignment expanding said ferro fluid along said long axes and thereby imparting strain to said piezo sheet.

2. The method according to claim 1 further including the step of sealing said holes or recesses with said ferro fluid therein in prior to step (c).

3. A device for generating electrical energy comprising:
   (a) a sheet of piezo material having holes or recesses;
   (b) a ferro fluid in said holes or recesses, said ferro fluid having non-spherical or oblong ferro particles with a long axis and a short axis perpendicular thereto, said ferro particles, upon being subjected to a magnetic force, becoming oriented with long axes of adjacent ferro particles becoming aligned, said alignment expanding said ferro fluid along said long axes and thereby imparting strain to said piezo sheet.

4. A device according to claim 3 wherein said piezo sheet has a first surface and a second surface parallel thereto, said holes extending between said first and second surfaces and further including first and second containment sheets adhered respectively to said first and second surfaces to retain said ferro fluid in said holes.

5. A device according to claim 3 wherein said sheet of piezo material has a thickness in the range of 0.005 mm to 200 mm.

6. A power generating device comprising:
   (a) a sheet of piezo material having the capability of generating an electric field when subjected to mechanical strain, said sheet having (i) a first surface and a second surface spaced therefrom and substantially parallel thereto and (ii) a plurality of recesses or holes extending from the first surface toward the second surface, said recesses or holes being positioned (A) in a plurality of rows, each extending in a straight line path in a first direction and being parallel to each adjacent row extending in said first direction, and (B) a plurality of rows, each extending in a second direction substantially perpendicular to said first direction; and
   (b) ferro fluid positioned in at least some of said recesses or holes, said ferro fluid having ferro particles which are non-spherical or oblong with opposing ends being a greater distance apart than other opposing areas thereof, said opposing ends defining a long axis and, upon introduction of a magnetic force, said ferro particles being movable to orient non-aligned long axes to positions of alignment with long axes of adjacent ferro particle thereby imparting strain to said sheet of piezo material.

7. A power generating device according to claim 6 wherein said first direction rows are spaced from each adjacent row to define a plurality of parallel aligned spaces.

8. A power generating device according to claim 7 wherein each of said rows extending in said second direction is spaced apart from each adjacent row extending in said second direction to define a plurality of parallel spaces extending in said second direction.

9. A power generating device according to claim 6 wherein alternate ones of said rows extending in said first direction are spaced apart from other alternate ones of said rows extending in said first direction but are not spaced apart from adjacent ones of said rows extending in said first direction.

10. A power generating device according to claim 9 wherein alternate ones of said rows extending in said second direction are spaced apart from other alternate ones of said rows extending in said second direction but are not spaced apart from adjacent ones of said rows extending in said second direction.

* * * * *